United States Patent
Green

(10) Patent No.: US 11,756,326 B2
(45) Date of Patent: Sep. 12, 2023

(54) KEEPOUT ZONE DETECTION AND ACTIVE SAFETY SYSTEM

(71) Applicant: LANTERN HOLDINGS, LLC, Sterling, VA (US)

(72) Inventor: Chad Thomas Green, Sterling, VA (US)

(73) Assignee: LANTERN HOLDINGS, LLC, Sterling, VA (US)

( * ) Notice: Subject to any disclaimer, the term of this patent is extended or adjusted under 35 U.S.C. 154(b) by 8 days.

(21) Appl. No.: 17/039,272

(22) Filed: Sep. 30, 2020

(65) Prior Publication Data

US 2021/0104006 A1    Apr. 8, 2021

Related U.S. Application Data

(60) Provisional application No. 62/909,581, filed on Oct. 2, 2019.

(51) Int. Cl.
| | |
|---|---|
| *G06V 40/10* | (2022.01) |
| *G06T 1/00* | (2006.01) |
| *G08B 5/22* | (2006.01) |
| *G06V 20/52* | (2022.01) |
| *F16P 3/14* | (2006.01) |
| *G06F 18/214* | (2023.01) |

(52) U.S. Cl.
CPC ............ *G06V 40/107* (2022.01); *F16P 3/142* (2013.01); *G06F 18/214* (2023.01); *G06T 1/0014* (2013.01); *G06V 20/52* (2022.01); *G06V 40/10* (2022.01); *G08B 5/22* (2013.01)

(58) Field of Classification Search
CPC .. G06T 1/0014; G06K 9/6256; G06V 10/143; G06V 10/22; G06V 20/52; G06V 40/10; G08B 5/22; F16P 3/142
See application file for complete search history.

(56) References Cited

U.S. PATENT DOCUMENTS

| | | | |
|---|---|---|---|
| 2018/0222052 A1* | 8/2018 | Vu | B25J 9/1697 |
| 2018/0349654 A1* | 12/2018 | Takeshima | G08B 13/183 |
| 2020/0189507 A1* | 6/2020 | Green | B60Q 1/52 |

* cited by examiner

*Primary Examiner* — Daniell L Negron
(74) *Attorney, Agent, or Firm* — BIRCH, STEWART, KOLASCH & BIRCH, LLP

(57) ABSTRACT

A keepout zone detection system and method for a hazardous area, such as the workspace around a power tool, that includes a safety device that controls a safety event, such as disabling the power tool, and a keepout zone detection device that includes at least one imager for imaging a workspace associated with the power tool. A processor dynamically determines the keepout zone specific to the power tool based on information received from the imager(s) or by referring to a predetermined keepout zone stored in a memory, where the processor includes a pre-trained neural network that processes the received images to further identify the presence of human appendage(s) within the keepout zone; and a communication device that communicates with the safety device to control the safety event, such as disabling the power tool, based on the determination of the presence of the human appendage within the keepout zone.

15 Claims, 4 Drawing Sheets

KEEPOUT ZONE DETECTION AND ACTIVE SAFETY SYSTEM

CROSS-REFERENCE TO RELATED APPLICATIONS

This application claims the benefit under 35 U.S.C. § 119(e) of the filing date of U.S. Patent Application No. 62/909,581, which was filed on Oct. 2, 2019 and which is incorporated here by reference.

BACKGROUND

This specification relates to automatic detection of human appendages within a keepout zone adjacent hazardous areas that may include power tools, hazardous surfaces, heavy machinery, mixing bins, chemical baths, etc.

Keepout zones are defined as areas where human appendages and body parts should not be located to avoid possibility of injury. For example, it is estimated that power tools cause an average of nearly 400,000 visits to the emergency room each year. These include power tools such as nail guns, chainsaws, table saws, circular saws, power drills, snowblowers, backhoes, air compression devices, wood chippers and riding lawn mowers. In all of these accidents, a person inadvertently violated a safety keepout zone of the equipment. In many cases, these accidents are preventable. If the keepout zone were carefully monitored for human presence, energy to the hazardous area could be removed prior to human contact. Conventional systems use optical breakscreens to guard an area from human entry. These screens, however, must be permanently installed, calibrated, and do not discriminate between human appendages and any other occlusion (similar to an elevator door with an optical screen). The present invention improves safety near hazardous areas by preventing accidental human contact without restricting the normal work flow of appropriate materials within the hazardous area.

SUMMARY

Embodiments of the invention relate to the automatic detection of human appendages within a keepout zone adjacent to a hazardous area. A hazardous area may include, but is not limited to: the cutting, abrading, impinging or perforating implement of a power tool; a hazardous surface such as hot plates, high-voltage lines, chemical baths, steam, rotating/moving surfaces, impingement gaps, etc. The keepout zone is either pre-determined in configuration settings, or automatically established by the system, method and devices described herein. Thus, safety is improved for individuals working with or near hazardous areas.

The embodiments of the present invention utilize sensors, along with a pre-trained machine learning model (i.e. neural network) to statically and/or dynamically define a three-dimensional (3D) keepout zone with respect to a specific hazardous area and process imagery from sensor data to determine if a human appendage has entered the defined keepout zone. If a human appendage is determined within a keepout zone, then a safety event is performed by a safety device, the safety event including activating safety features and/or providing an audible, haptic, and/or visual warning to a user and others in the area.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
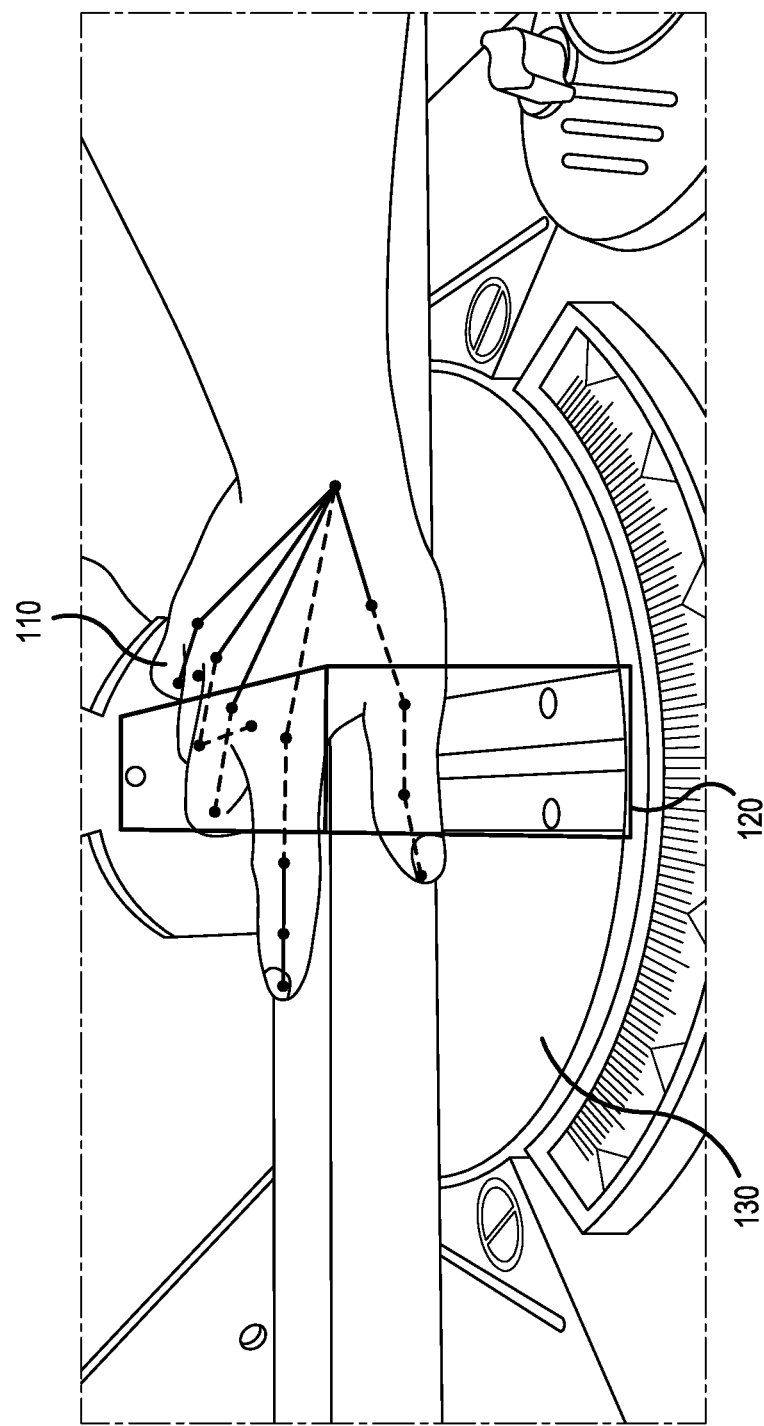
FIG. 1 illustrates an exemplary keepout zone.
Figure 2:
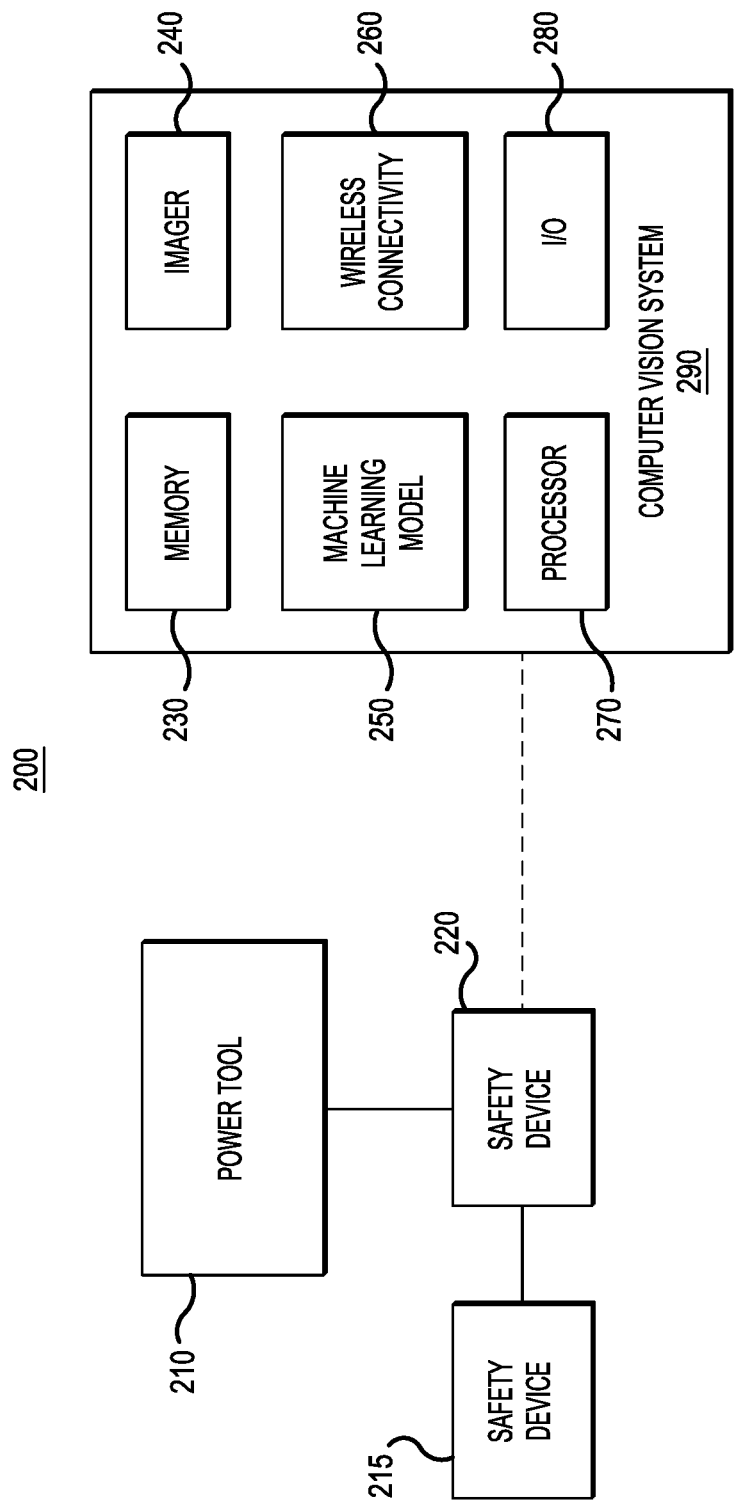
FIG. 2 illustrates an exemplary keepout zone detection system.

FIG. 1 illustrates the use of an active static keepout zone associated with a mitre saw 130 and being monitored by a computer vision system 290 as illustrated in FIG. 2. The computer vision system 290 may be comprised of at least one imager 240, memory 230, and processor 270 sufficient to process the images including passing them through a machine learning model 250. The imager 240 is mounted near the mitre saw 130 such that the field of view of the imager 240 covers all or most of the deck of the saw as shown in FIG. 1. The hazardous area in this case is the area below and near the circular blade. The keepout zone 120 can be any area determined to define the hazardous area. In the embodiment of FIG. 1, the computer vision system 290 determines the keepout zone 120 by locating the blade and extending a 3-dimensional box around the blade and the down to the surface of the deck. The process of determining the keepout zone 120 may be achieved via optical fiducials, such as multidimensional barcodes or markers, or via pre-trained machine learning model 250. A computer vision system 290 also processes the video in real-time through a pre-trained machine learning model 250 to mark the pose and location of joints 110 in the human appendage. In FIG. 1 a human hand is shown and the pose and location of the joints 110 of the human hand is determined and marked from which human fingers can then be determined within the frame. The method of locating pose and location of human joints in a single frame or video stream of images is known in the conventional arts of computer vision. If the computer vision system 290 detects any interference between the human appendage(s) and the keepout zone 120, the computer vision system 290 triggers a safety device 220, which in this embodiment would be to interrupt power to the mitre saw 130. The computer vision system 290 and methods used in FIG. 1 are described in more detail below.

FIG. 2 illustrates a keepout zone detection system 200 of the present invention. FIG. 2. illustrates the embodiments of the present invention with respect to a keepout zone of a power tool 210, such as the mitre saw 130 of FIG. 1. The power tool 210 may be any tool such as a drill, saw, nail gun, etc. In the embodiment of a corded power tool, the power tool 210 is connected externally to a safety device 220 which controls power from the power source 215 to the power tool 210. In this embodiment, the safety device may be an electrical relay. The computer vision system 290 monitors the hazardous area, processing images from the imager 240. The processor 270 communicates with the imager 240 through wired I/O 280 or wireless connectivity 260. The processor pre-processes images such as but not limited to resizing, normalizing, and other pre-processing methods as required by the machine learning model 250. The processor 270 processes the images through the machine learning model 250 and receives output from the machine learning model 250, such as but not limited to classifications, bounding, boxes, probabilities etc., as appropriate for the machine learning model 250 architecture. The processor 270 communicates with the safety device 220 via wired I/O 280 or wireless connectivity 260. When a human appendage is determined to be within the keepout zone, the processor 270 commands the safety device 220 to interrupt power from the power source 215 to the power tool 210.

In other embodiments, the power source 215 and the safety device 220 may be embedded or co-located with the power tool 210 such as in cordless power tools. The safety device 220 may be integrated into the power tool 210 and/or the power source 240 such as the removable battery. In this embodiment, the computer vision system 290 communicates wirelessly with the safety device 220.

The memory 230 stores both long-term and short-term data associated with particular processing tasks related to the processor 270 and system. For example, the memory 230 may store a lookup table of markers and their associated keepout zone geometry as well as information about their respective tool (with hazardous area) and safety device. It may also store real-time sensor data which is buffered in anticipation of being processed through the machine learning model 250.

The imager 240 may be comprised of one or more of the sensors described in embodiments of this application. Such sensors may include ultra-sonic, radar, thermal, or optical sensing methods such as lidar or depth cameras, or computer vision with or without pre-trained machine learning models 250. Common applications may include a camera mounted above a table saw running a machine learning model 250 that is trained to find human appendages, such as hands, feet, legs and arms, even when such appendages are covered by gloves, boots, or clothing. Such a camera could be built into the tool, for example in the grip of a mitre saw, or mounted in any location such that the cutting, nailing, or drilling area of the tool is visible by the camera.

When the presence of a human appendage is determined to be within a keepout zone, the processor 270 communicates with a safety device 220 by wireless connection 260 or by wired communication using I/O 280. The safety device 220 then shuts off the power to one or both of the power tool 210 and power source 215 and/or directly engages one or more safety features within and/or outside the power tool 210.

Figure 3B:
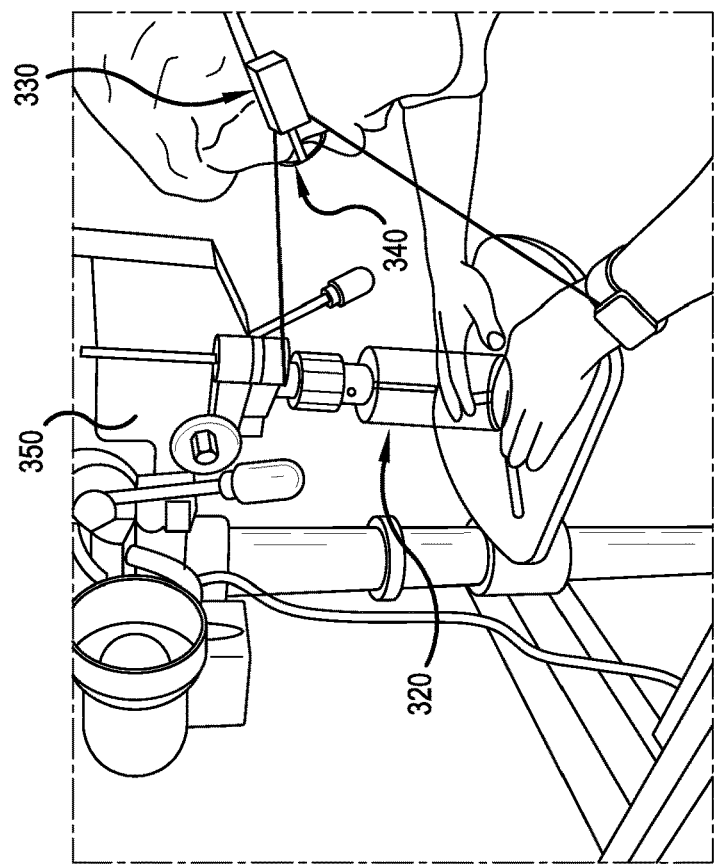
FIG. 3B illustrates an exemplary keepout zone with a wearable imager
Figure 3A:
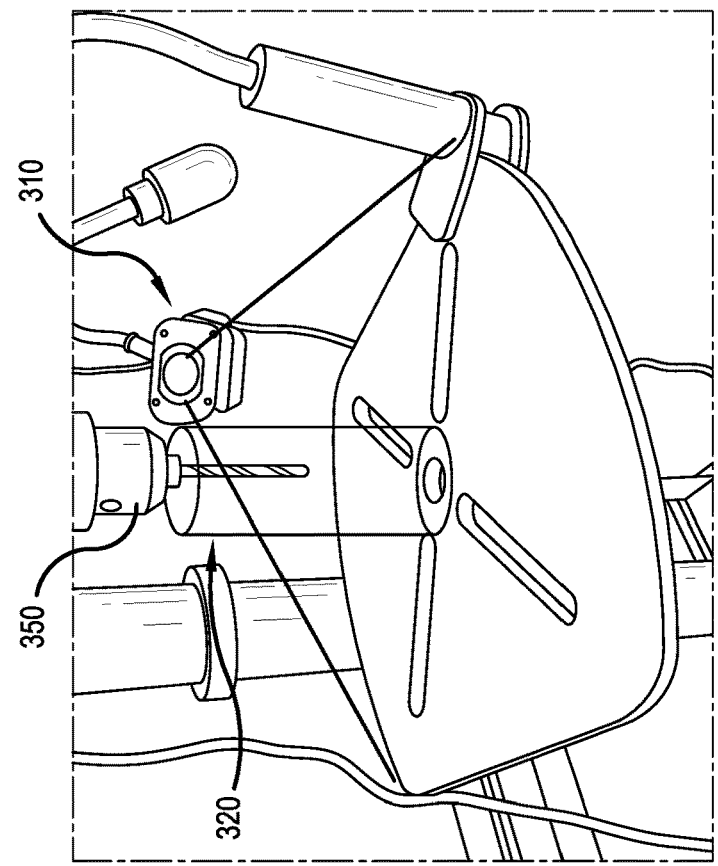
FIG. 3A illustrates an exemplary keepout zone with fixed imager

In embodiments as illustrated in FIGS. 3A and 3B an active keepout zone is determined dynamically. FIG. 3A illustrates a stand-alone camera 310 which is flexibly mounted to the table of the drill press 350. The stand-alone camera may be mounted in any manner on the drill press 350 or adjacent thereto which allows for the stand-alone camera 310 to have a view of the hazardous area, which in this case is defined as the deck of the drill press 350, and includes the keepout zone 320. The keepout zone 320 is dynamically detected since the camera is not fixed. The method of dynamic detection is described in more detail below. The information from the camera 310 is relayed to the processor 270 for determination of the keepout zone 320 and monitoring thereof for human appendages entering the keepout zone 320.

FIG. 3B illustrates a similar concept to FIG. 3A of a dynamically-determined keepout zone 320. However, in this embodiment, the sensor 330 is worn by the user. The sensor could be one of the aforementioned systems integrated into glasses 340, such as safety glasses, that may include an augmented reality display in the glasses or a heads-up display, or somewhere on the user's person which provides a field of view of the workspace. The keepout zone 320 may be visible to the user using any display device. The user may then see the keepout zone 320 similarly as marked by the cylinder in FIG. 3B as a graphical representation. When a human appendage is determined to be within the keepout zone 320, a notification that is visual, haptic, or acoustic may be provided by the safety device 220 and power to the drill press 350 may also be interrupted. In the embodiment of FIG. 3B the keepout zone 320 may be marked, for example in a red color, when a user's body part such as a hand is detected within the keepout zone 320.

Augmented Reality headsets may be used in embodiments of the present invention. The sensors in these headsets are able to measure the 6DOF pose of hands in real-time and use the information to interact with images and information rendered on the user display. For example, one may "click" on an image by tapping the thumb and forefinger together or one may drag and drop an item by closing a fist, translating the fist, and then opening the first in a new location. Augmented reality objects are also rendered and drawn in fixed locations which are visible with the headset from all orientations.

One embodiment of the present invention may employ an augmented reality headset display and sensor suite to sense the environment of the user, find hazardous surfaces within that environment using optical fiducials or trained object detectors, establish a keepout zone 320, and warn the user whenever fingers or appendages are detected within or approaching the keepout zone 320. The warning could be haptic, visual, or acoustic. The warning may also be wirelessly transmitted to a safety device 220 to perform a safety event preemptively, avoiding injury to the user.

Another embodiment of the present invention may employ only a subset of an Augmented Reality headset, such as the display and imagers, but no other sensors. The image data may be transmitted to an off-device processor, such as a tethered mobile phone. The transmission may be wired or wireless.

Moving the sensing requirements and processing requirements from the headset reduces the Size, Weight, Power, and Cost (SWAP-c) of the headset and may be more ergonomic for the user. In embodiments of the invention, the computer vision system only requires the pose relative to the hazardous surface, not the absolute pose of the user's head within a room. Therefore, absolute positioning sensors and related processing are not required, simplifying the system. Using the optical fiducials previously described and standard computer vision methods, only the video from the headset may be necessary to determine the 6DOF pose of the keepout zone 320. Similarly, the 6DOF pose of fingers may be estimated using the pre-trained machine learning model 250.

This low-cost solution to finding hazardous surfaces within the proximity of a worker may be worn at all times by all workers. Warnings may be issued to the worker as previously described and safety events performed to prevent injury.

In the embodiment of FIG. 1, the keepout zone 120 is predetermined, thus static. This assumes that the imager 240, such as a camera, is located in a fixed position and will not be moved without recalibration. Initial calibration is accomplished by measuring the distance between the imager 240 mounting location and using the known properties of the lens to calculate the per-pixel scale factor. The per-pixel scale factor provides an estimation of the size and location of objects found within the imager 240 field of view. A two-dimensional projection of a three-dimensional rectangle is then drawn on the image representing the three-dimensional keepout zone 120.

In the embodiments of FIGS. 3A and 3B, the keepout zone 320 is determined dynamically. This assumes that the imager 240 is not static, that it may be worn by the user, or placed by the user during normal operation. The computer vision system 290 must determine the location and size of the keepout zone 320 in real-time. Thus, any number of computer vision methods may be employed. One option may be to search for optical fiducials (markers) placed on the work surface. These markers may be placed in multiple locations so that at least one of them is visible by the imager 240 at all times. The marker may be comprised of multi-dimensional barcodes with information about the location of the keepout zone 320, the hazards specific to the hazardous area(s), and which safety devices 220 from amongst one or more safety devices 220 control the safety events related to the hazardous area(s).

For example, markers are used commonly in augmented reality applications to overlay 3D figures, images, and animations within a 3D landscape (for example, a dynamic picture on a wall, or architectural sketch on a table). The applications use the information in the marker to determine the 6 Degree of Freedom (6DOF) pose and relative position of each marker within the field of view of the augmented reality headset. The overlaid graphical objects are then rendered on the scene in real-time with the correct orientation and appear to be fixed in their position in the headset's field of view. In embodiments of the invention, the 3D keepout zone 320 can similarly be overlaid on the field of view of the imager 240 and appear to remain fixed in space as the user views the scene from different locations in the workspace.

Another augmented reality method uses no markers and finds keypoint descriptors on the surface of the target. The 6DOF pose of the imager 240 relative to the surface is determined by optical flow and correlating inertial information of the imager 240 itself (such as the IMU in a mobile device). Another option may use a depth camera such as a stereoscopic camera, time-of-flight camera, or other ranging imager 240.

Alternatively, one could train a machine learning model 250 to determine the 6DOF pose and location of hazardous surfaces, such as the drill bit or mitre saw blade. This method has been successful for estimating the 6DOF pose of a human skeleton in 3D pose estimation projects. Training a machine learning model or a deep neural network for such a task is described in detail in a subsequent section of this document.

Using one or more of the above described methods, the dynamic, real-time location of the keepout zone 320 is determined.

In all embodiments, the location of the keepout zone 320 as well as the location of all fingers and human appendages within the field of view of the imager 240 is determined by the computer vision system 290 such as the stand-alone camera or glasses. If a human appendage is determined to be within a keepout zone (120, 320), a signal is sent from the computer vision system 290 to a safety device 220 to control a safety event such as a power interrupting system, which locks out power to the tool or hazardous surface until the interference is removed.

In another embodiment, the neural network performs the process of image segmentation which classifies each pixel within the frame as human, keepout, background, or another category. Rather than just the joints and skeleton, the outline of the human figure with all appendages is marked on the image. Based on the pixel-level classification, the presence of a human appendage within a keepout zone may be determined more precisely. Through training, this method is effective with either bare skin or covered skin.

Conventionally, in order to detect skeletal features such as a finger, conventional systems require controlled environments where the lighting and background do not change rapidly. For example, a camera may be placed in a fixed location, imaging a fixed area on a conveyor belt. The lighting is consistent and the color and texture of the belt are uniform such that the background of the working area can be measured, saved, and subtracted from real-time imagery. As objects move through the vision system's field of view on the conveyor belt, only the objects are detected as being significantly different from the background. Variations of this technique have been optimized and implemented in many automatic inspection systems over the last several decades in factories and shipping environments. The difficulty in using such a system in embodiments of present invention is that neither the background, nor the lighting, nor the placement of the imaging sensor may be consistent from frame to frame.

Thus, embodiments of the present invention use a pre-trained neural network to determine appendages such as hands. Hand keypoints are annotated in a very large database of captured images and video. Training images may be captured simultaneously from multiple cameras which surround the subject from multiple angles. A statistical method of automating the annotation process is employed by recursively estimating the joint locations via a pre-trained neural network on each image from each of the surrounding imagers for a given point in time. The camera locations are known so the location of the joints should correlate from imager to imager. The estimations can therefore be combined to calculate the highest probability of the joint locations in each frame based on correlating images.

Once this large database of images from multiple viewpoints is accurately annotated with joint locations such as 110 shown in FIG. 1, a neural network can be trained to predict joint locations in a single, two-dimensional image. The trained network is frozen and can be deployed for use in edge devices such as cell phones, laptops, and even resource-constrained devices such as micro-controllers and Field-programmable Gate Arrays (FPGAs). These devices can then predict (infer) the 3D joint locations on real-time images or image streams as in the embodiments of the present invention. The affinity between joint locations are determined at inference time to give a real-time estimation of the hand skeleton. Hands of multiple users can be determined in real-time as well, not just the ego-centric set of hands.

Figure 4:
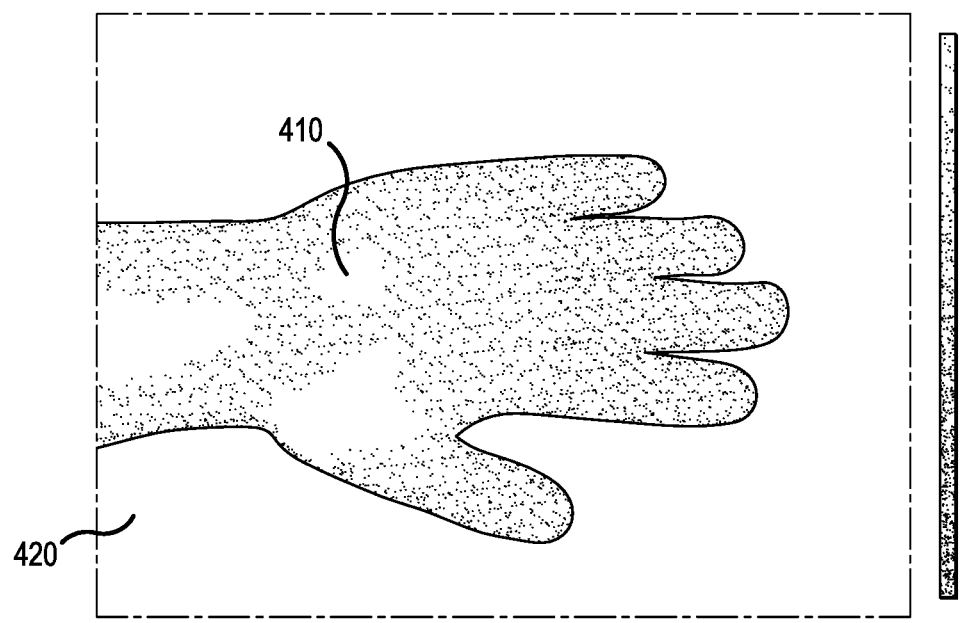
FIG. 4 illustrates a use of a thermal imager.
Like reference numbers and designations in the various drawings indicate like elements.

FIG. 4 shows an embodiment of the invention in which an image of a hand 410 as captured by a thermal imager. A thermal imager measures the black body radiation of objects giving a strong contrast between human skin and background 420. A thermal imager may be used as an additional tool to detect human appendages. This may be used in conjunction with other imagers, such as a camera, and/or visual display devices as discussed above. The thermal image contrast aides in segmenting human fingers in images from objects in the hand as well as the background. With computer vision techniques, this segmentation can make finger detection run more efficiently and more accurately. The segmented image may also be fed into the neural network as an additional input layer that the network can then train off of when attempting to locate joint keypoints 110 in FIG. 1.

In embodiments where a neural network is used, the network must be pre-trained. The process of capturing data, training, and validating the neural network is repeated many times until the acceptable performance is obtained. Following validation, the network is optimized to fit and perform within the constraints of the processor 270. The optimized network is deployed to that device where real-time performance may be measured.

The purpose of the training data is to provide the neural network a very diverse set of data that is representative of a plurality of actual use scenarios. The network requires both the sensor input (each timestamp of sensor input) as well as annotation files with the correct annotation which will become the network output. Having accurate annotations is crucial to a high-performing network as the difference between predicted network output and the values found in the annotation files determines the error function that is calculated and back-propagated through the network during training. Any error in the annotation file will adversely affect the performance of the network.

In embodiments of the present invention, the sensor input to the network may be comprised of time-series data, such images from a video stream, depth information from depth imagers, and/or inertial data from sensors colocated with the imager, as well as the 6DOF pose of both the imager as well as the keepout volume and hazardous surfaces. The 6DOF pose may be captured by external instrumentation such as a motion capture system and synchronized to the other sensor data to simplify and automate data annotation.

The data may be captured using an instrumented motion capture system. Users as well as their head-mounted or body-worn or fixed location imagers are instrumented with markers that the motion capture system can detect accurately. Their 6DOF pose within the motion capture system is recorded at all times. Users are instructed to perform typical operations in a plurality of representative scenarios, such as working in a workshop with many nearby tools and hazardous surfaces. The hazardous surfaces are also instrumented by affixing optical fiducials that the real-time imagers will detect. For each frame of sensor input, all annotations must be correctly recorded.

Once sufficient data has been captured and annotated, network training begins. The data is consolidated into a training set and test set. The training files are repeatedly fed to the neural network during training routines, while the test set is used exclusively for evaluating the performance of each training cycle. In this manner, the network is always evaluated using test data that it has never seen before.

During the training cycle, hyper-parameters are optimized such as learning rate, batch size, momentum, and weight decay. Additionally, several optimization methods may be explored to improve the accuracy of the network such as Stochastic Gradient Descent or Adam and/or other variants as best practices in training methods evolve.

Once satisfactory network performance has been achieved, a final evaluation step on real-world data is necessary to determine how well the network generalizes to new data, including new users and new user actions for the fastener driver. During this validation process, data is again collected and annotated for future training cycles to remove outliers in performance. This training sequence is iteratively repeated to continually improve performance and add new test conditions and scenarios.

After training is complete, the network is frozen and optimized for efficient performance on an embedded device. This process may include quantizing the network, removing floating point operations and extraneous test and debug nodes. This improves performance on a resource-constrained device, such as a microcontroller, FPGA, or neural network accelerator. The frozen neural network is included when compiling the run-time executable, machine instructions, etc. Real-time data, as captured by the device, is then passed through the network during live operation of the tool, and real-time classifications of the material are made.

Although the present invention largely describes the implementation with power tools, the methods and system described could apply to any keepout zone with respect to hazardous areas.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more memory devices for storing data. However, a computer need not have such devices.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

What is claimed is:

1. A dynamic keepout zone detection system for a hazardous area, comprising:
    a computer vision system, including:
        at least one non-stationary imager for imaging the hazardous area;
        a processor that determines a dynamic keepout zone specific to the hazardous area based on information received from the imager, the dynamic keepout zone being defined in location and size within the field of view of the at least one non-stationary imager, the processor includes a pre-trained machine learning model that processes the received information to identify and differentiate a human appendage within the dynamic keepout zone from other materials within the dynamic keepout zone and thereby distinguish between a presence of a human appendage and other materials within the dynamic keepout zone; and
        a communication device that communicates with a safety device to perform a safety event when a human appendage is determined to be within the keepout zone.

2. The dynamic keepout zone detection system of claim 1, wherein the position of the imager is dynamic relative to the keepout zone.

3. The dynamic keepout zone detection system of claim 1, wherein the safety event is a disabling of the power to a power tool.

4. The dynamic keepout zone detection system of claim 1, wherein the pre-trained machine learning model determines the position of the keepout zone.

5. The dynamic keepout zone detection system of claim 1, wherein the at least one imager is a thermal camera or a depth camera.

6. The dynamic keepout zone detection system of claim 1, wherein the at least one imager is integrated with wearable glasses and provides visual information of the dynamic keepout zone to a user.

7. The dynamic keepout zone detection system of claim 6, wherein the visual information is color defined to distinguish when the human appendage is determined to be within the dynamic keepout zone.

8. A dynamic keepout zone detection method for a hazardous area, comprising:
    imaging the hazardous area using at least one non-stationary imager;
    determining by a processor, a dynamic keepout zone specific to the hazardous area based on information received from the imager, the dynamic keepout zone being defined in location and size within the field of view of the at least one non-stationary imager, the processor includes a pre-trained machine learning model that processes the received information to identify and differentiate a human appendage within the dynamic keepout zone from other materials and thereby distinguish between a presence of a human appendage and other materials within the dynamic keepout zone; and
    communicating with a safety device to perform a safety event when a human appendage is determined to be within the dynamic keepout zone.

9. The dynamic keepout zone detection method of claim 8, wherein the position of the imager is dynamic relative to the keepout zone.

10. The dynamic keepout zone detection method of claim 8, wherein the safety event is a disabling of the power to a power tool.

11. The dynamic keepout zone detection method of claim 8, wherein the pre-trained machine learning model determines the position of the dynamic keepout zone.

12. The dynamic keepout zone detection system of claim 8, wherein the at least one imager is a thermal camera or a depth camera.

13. The dynamic keepout zone detection method of claim 8, wherein the at least one imager is integrated with wearable glasses and provides visual information of the dynamic keepout zone to a user.

14. The dynamic keepout zone detection method of claim 13, wherein the visual information is color defined to distinguish when the human appendage is determined to be within the dynamic keepout zone.

15. A dynamic keepout zone detection device for determining a presence of a human appendage within a hazardous area, comprising:
    an input configured to receive information from at least one non-stationary imager;
    a processor that determines the dynamic keepout zone specific to the hazardous area based on the information received from the imager, the dynamic keepout zone being defined in location and size within the field of view of the at least one non-stationary imager, the processor includes a pre-trained machine learning model that processes the received information to distinguish between a presence of the human appendage within the dynamic keepout zone and other materials within the dynamic keepout zone;
    an output configured to communicate with a safety device to perform a safety event when the human appendage is determined to be within the dynamic keepout zone.

* * * * *